US011693712B2

(12) United States Patent
Glass

(10) Patent No.: US 11,693,712 B2
(45) Date of Patent: *Jul. 4, 2023

(54) TECHNIQUES FOR PREVENTING CONCURRENT EXECUTION OF DECLARATIVE INFRASTRUCTURE PROVISIONERS

(71) Applicant: Oracle International Corporation, Redwood Shores, CA (US)

(72) Inventor: Nathaniel Martin Glass, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,823

(22) Filed: Mar. 31, 2022

(65) Prior Publication Data

US 2022/0222123 A1    Jul. 14, 2022

Related U.S. Application Data

(63) Continuation of application No. 17/016,802, filed on Sep. 10, 2020, now Pat. No. 11,321,138.

(Continued)

(51) Int. Cl.
*H04L 67/566* (2022.01)
*G06F 9/50* (2006.01)
(Continued)

(52) U.S. Cl.
CPC .......... *G06F 9/5061* (2013.01); *G06F 3/0484* (2013.01); *G06F 8/60* (2013.01);
(Continued)

(58) Field of Classification Search
CPC ............... H04L 67/566; H04L 67/1008; H04L 67/1031
See application file for complete search history.

(56) References Cited

U.S. PATENT DOCUMENTS 9,876,703 B1    1/2018  Arllen et al.
10,511,675 B1   12/2019 Chud
(Continued)

OTHER PUBLICATIONS

"AGS Data Diode Technical Requirements Programmatic Requirements", received on Dec. 20, 2019, 3 pages.
(Continued)

*Primary Examiner* — Ryan J Jakovac
(74) *Attorney, Agent, or Firm* — Kilpatrick Townsend & Stockton LLP

(57) ABSTRACT

Techniques for preventing concurrent execution of an infrastructure orchestration service are described. Worker nodes can receive instructions, or tasks, for deploying infrastructure resources and can provide heartbeat notifications to scheduler nodes, also considered a lease. A signing proxy can track the heartbeat notifications sent from the worker nodes to the scheduler node. The signing proxy can receive requests corresponding to a performance of the tasks assigned to the worker nodes. The signing proxy can determine whether the lease between each worker node and the scheduler is valid. If the lease is valid, the signing proxy may make a call to services on behalf of the worker node, and if the lease is not valid, the signing proxy may not make a call to services on behalf of the worker node. Instead, the signing proxy may cut off all outgoing network traffic, blocking access of the worker node to services.

20 Claims, 14 Drawing Sheets

Related U.S. Application Data

(60) Provisional application No. 62/963,491, filed on Jan. 20, 2020, provisional application No. 62/963,413, filed on Jan. 20, 2020, provisional application No. 62/963,456, filed on Jan. 20, 2020, provisional application No. 62/963,477, filed on Jan. 20, 2020, provisional application No. 62/963,478, filed on Jan. 20, 2020, provisional application No. 62/963,480, filed on Jan. 20, 2020, provisional application No. 62/963,452, filed on Jan. 20, 2020, provisional application No. 62/963,486, filed on Jan. 20, 2020, provisional application No. 62/963,489, filed on Jan. 20, 2020, provisional application No. 62/963,481, filed on Jan. 20, 2020, provisional application No. 62/963,335, filed on Jan. 20, 2020.

(51) Int. Cl.

| | |
|---|---|
| *G06F 8/71* | (2018.01) |
| *H04L 41/5054* | (2022.01) |
| *H04L 41/0816* | (2022.01) |
| *G06F 8/60* | (2018.01) |
| *H04L 41/5041* | (2022.01) |
| *H04L 41/50* | (2022.01) |
| *G06F 9/38* | (2018.01) |
| *G06F 9/4401* | (2018.01) |
| *H04L 41/0806* | (2022.01) |
| *G06F 9/48* | (2006.01) |
| *G06F 11/07* | (2006.01) |
| *G06F 11/32* | (2006.01) |
| *G06F 16/901* | (2019.01) |
| *G06F 9/445* | (2018.01) |
| *G06F 9/451* | (2018.01) |
| *G06F 3/0484* | (2022.01) |
| *H04L 67/00* | (2022.01) |
| *G06F 11/14* | (2006.01) |
| *G06F 11/36* | (2006.01) |
| *H04L 67/10* | (2022.01) |
| *H04L 67/1008* | (2022.01) |
| *H04L 67/1031* | (2022.01) |
| *G06F 8/61* | (2018.01) |

(52) U.S. Cl.
CPC .............. *G06F 8/71* (2013.01); *G06F 9/3836* (2013.01); *G06F 9/4411* (2013.01); *G06F 9/44505* (2013.01); *G06F 9/451* (2018.02); *G06F 9/485* (2013.01); *G06F 9/4856* (2013.01); *G06F 9/505* (2013.01); *G06F 9/5011* (2013.01); *G06F 9/5022* (2013.01); *G06F 9/5027* (2013.01); *G06F 9/5038* (2013.01); *G06F 9/5072* (2013.01); *G06F 9/5077* (2013.01); *G06F 11/0757* (2013.01); *G06F 11/1469* (2013.01); *G06F 11/327* (2013.01); *G06F 11/3664* (2013.01); *G06F 11/3684* (2013.01); *G06F 16/9024* (2019.01); *H04L 41/0806* (2013.01); *H04L 41/0816* (2013.01); *H04L 41/5041* (2013.01); *H04L 41/5048* (2013.01); *H04L 41/5054* (2013.01); *H04L 41/5096* (2013.01); *H04L 67/10* (2013.01); *H04L 67/1008* (2013.01); *H04L 67/1031* (2013.01); *H04L 67/34* (2013.01); *H04L 67/566* (2022.05); *G06F 8/61* (2013.01)

(56) References Cited

U.S. PATENT DOCUMENTS

| | | |
|---|---|---|
| 11,321,137 B2 | 5/2022 | Barsalou et al. |
| 11,321,138 B2 | 5/2022 | Glass |
| 2007/0101204 A1 | 5/2007 | Chen et al. |
| 2010/0042989 A1 | 2/2010 | Anand et al. |
| 2014/0189084 A1 | 7/2014 | Kamenetsky et al. |
| 2016/0098262 A1 | 4/2016 | Spivak et al. |
| 2016/0371079 A1 | 12/2016 | Balasubramanian et al. |
| 2017/0063615 A1 | 3/2017 | Yang et al. |
| 2018/0165122 A1 | 6/2018 | Dobrev |
| 2019/0050213 A1 | 2/2019 | Schanafelt et al. |
| 2019/0122156 A1 | 4/2019 | Asthana et al. |
| 2019/0213115 A1 | 7/2019 | Takawale et al. |
| 2019/0220321 A1 | 7/2019 | Yang |
| 2020/0220848 A1 | 7/2020 | Patwardhan |
| 2020/0244527 A1 | 7/2020 | Sharma et al. |
| 2020/0285462 A1 | 9/2020 | Sabath et al. |
| 2020/0293382 A1 | 9/2020 | Ivancich et al. |
| 2021/0019193 A1 | 1/2021 | Ffrench et al. |
| 2021/0056466 A1 | 2/2021 | Ortyl, III et al. |
| 2021/0073625 A1 | 3/2021 | Cai |

OTHER PUBLICATIONS

"AGS Technical Design", received on Dec. 20, 2019, 13 pages.
"Configuring the SDK for JavaScript—AWS SDK for JavaScript", Amazon Web Services, Incorporation, 2019, 7 pages.
"Design Details", received on Dec. 20, 2019, 5 pages.
"Disconnected Region Support", received on Dec. 20, 2019, 15 pages.
"Shepherd Business Case and Executive Summary", received on Dec. 20, 2019, 33 pages.
"Shepherd Capabilities Service", received on Dec. 20, 2019, 5 pages.
"Shepherd Regional" received on Dec. 20, 2019, 4 pages.
"Shepherd Regional Control Plane", received on Dec. 20, 2019, 4 pages.
"Shepherd Regional Executor Service", received on Dec. 20, 2019, 15 pages.
"Terraform Yield", received on Dec. 20, 2019, 6 pages.
U.S. Appl. No. 17/008,102, Final Office Action dated Sep. 22, 2021, 23 pages.
U.S. Appl. No. 17/008,102, First Action Interview Office Action Summary dated Jun. 23, 2021, 7 pages.
U.S. Appl. No. 17/008,102, First Action Interview Pilot Program Pre-Interview Communication dated Apr. 30, 2021, 7 pages.
International Patent Application No. PCT/US2020/062294, International Search Report and Written Opinion dated Mar. 9, 2021, 12 pages.
U.S. Appl. No. 17/008,102, Notice of Allowance dated Jan. 12, 2022, 13 pages.
U.S. Appl. No. 17/016,802, First Action Interview Office Action Summary dated Sep. 17, 2021, 3 pages.
U.S. Appl. No. 17/016,802, First Action Interview Pilot Program Pre-Interview Communication dated Jul. 16, 2021, 5 pages.
U.S. Appl. No. 17/016,802, Notice of Allowability dated Feb. 16, 2022, 6 pages.
U.S. Appl. No. 17/016,802, Notice of Allowance dated Jan. 25, 2022, 9 pages.
U.S. Appl. No. 17/103,733, Non-Final Office Action dated Sep. 9, 2021, 12 pages.
International Application No. PCT/US2020/062294, International Preliminary Report on Patentability dated Aug. 4, 2022, 9 pages.
International Application No. PCT/US2021/013585, International Search Report and Written Opinion dated Apr. 23, 2021, 12 pages.
Sarma et al., Palantir: Early Detection of Development Conflicts Arising from Parallel Code Changes, Institute of Electrical and Electronics Engineers Transactions on Software Engineering, vol. 38, No. 4, Jul.-Aug. 2012, pp. 889-908.

(56) References Cited

OTHER PUBLICATIONS

Servant et al., CASI: Preventing Indirect Conflicts Through a Live Visualization, Proceedings of the 2010 ICSE Workshop on Cooperative and Human Aspects of Software Engineering, May 2010, pp. 39-46.

U.S. Appl. No. 17/150,778, Notice of Allowance dated Apr. 13, 2023, 11 pages.

U.S. Appl. No. 17/710,921, Notice of Allowance dated Feb. 10, 2023, 11 pages.

```
"mode": "managed"
"type": type of deployment  ← 702
"name": "executor_ad1"  ← 704
"provider": type of provider
"instances":
{
"attributes": {                      ← 706
...
"release_id": "7e29d6aa-7dc6-4268-9f90-e57caf76e714"
"state": "SUCCEEDED"
                                     ← 708
...
}
...
}
```

```
provider "provider name" {
...
release_id = local.release_id          ← 804
execution_id = local.execution.id      ← 806
...
} locals {
    release_id = "39ed7b9c-5519-4069-896d-8e17ed4fc29e"
...                                                        ← 808
execution_target = {        ← 810
    name: "ap-melbourne-1"
...                  ← 812
}
...
}
```

TECHNIQUES FOR PREVENTING CONCURRENT EXECUTION OF DECLARATIVE INFRASTRUCTURE PROVISIONERS

CROSS-REFERENCE TO RELATED APPLICATION

The present application is a continuation of, and claims the benefit of and priority to, U.S. patent application Ser. No. 17/016,802, filed on Sep. 10, 2020, which is a non-provisional application of, and claims the benefit and priority under 35 U.S.C. 119(e) of the following U.S. Provisional Applications, the entire contents of which are incorporated by reference for all purposes:
U.S. Provisional Application No. 62/963,491, filed Jan. 20, 2020, entitled "TECHNIQUES FOR PREVENTING CONCURRENT EXECUTION OF DECLARATIVE INFRASTRUCTURE PROVISIONERS,"
U.S. Provisional Application No. 62/963,413, filed Jan. 20, 2020, entitled "TECHNIQUES FOR DETECTING DRIFT IN A DEPLOYMENT ORCHESTRATOR";
U.S. Provisional Application No. 62/963,456, filed Jan. 20, 2020, entitled "USER INTERFACE TECHNIQUES FOR AN INFRASTRUCTURE ORCHESTRATION SERVICE";
U.S. Provisional Application No. 62/963,477, filed Jan. 20, 2020, entitled "TECHNIQUES FOR UTILIZING DIRECTED ACYCLIC GRAPHS FOR DEPLOYMENT INSTRUCTIONS";
U.S. Provisional Application No. 62/963,478, filed Jan. 20, 2020, entitled "TECHNIQUES FOR RESOLVING APPLICATION UPDATES";
U.S. Provisional Application No. 62/963,480, filed Jan. 20, 2020, entitled "TECHNIQUES FOR MANAGING DEPENDENCIES OF AN ORCHESTRATION SERVICE";
U.S. Provisional Application No. 62/963,452, filed Jan. 20, 2020, entitled "TECHNIQUES FOR ROLLBACK OF AN INFRASTRUCTURE ORCHESTRATION SERVICE";
U.S. Provisional Application No. 62/963,486 filed Jan. 20, 2020, entitled "TECHNIQUES FOR DEPLOYING INFRASTRUCTURE COMPONENTS IN PHASES";
U.S. Provisional Application No. 62/963,489, filed Jan. 20, 2020, entitled "TECHNIQUES FOR MANAGING LONG-RUNNING TASKS WITH A DECLARATIVE PROVISIONER";
U.S. Provisional Application No. 62/963,481, filed Jan. 20, 2020, entitled "TECHNIQUES FOR TRANSFERRING DATA ACROSS AIR GAPS"; and
U.S. Provisional Application No. 62/963,335, filed Jan. 20, 2020, entitled "TECHNIQUES FOR DEPLOYING INFRASTRUCTURE RESOURCES WITH A DECLARATIVE PROVISIONING TOOL".
U.S. patent application Ser. No. 17/016,802, is also related to application Ser. No. 17/016,754, filed on Sep. 10, 2020, entitled "TECHNIQUES FOR DEPLOYING INFRASTRUCTURE RESOURCES WITH A DECLARATIVE PROVISIONING TOOL," the entire contents of which is hereby incorporated by reference as if fully set forth herein, under 35 U.S.C. § 120.

BACKGROUND

Today, cloud infrastructure services utilize many individual services to provision and deploy code and configuration (respectively) across the cloud infrastructure service's many regions. These tools require significant manual effort to use, especially given that provisioning cloud infrastructure resources is generally declarative and deploying these resources is generally imperative. Additionally, as the number of service teams and regions grows, the cloud infrastructure service will need to continue to grow. Some cloud infrastructure service's strategies of deploying to a larger number of smaller regions includes per-region expenditures, which may not scale well.

BRIEF SUMMARY

Techniques for preventing concurrent execution of an infrastructure orchestration service are described. In some examples, a method can include worker nodes that can receive instructions, or tasks, for deploying infrastructure resources and can provide heartbeat notifications to scheduler nodes, also considered a lease. A signing proxy can track the heartbeat notifications sent from the worker nodes to the scheduler node. The signing proxy can receive requests corresponding to a performance of the tasks assigned to the worker nodes. The signing proxy can determine whether the lease between each worker node and the scheduler is valid. If the lease is valid, the signing proxy may make a call to services on behalf of the worker node, and if the lease is not valid, the signing proxy may not make a call to services on behalf of the worker node. Instead, the signing proxy may cut off all outgoing network traffic, blocking access of the worker node to services.

In other examples, a system can include at least one processor and at least one memory that can store computer-executable instructions that, when executed by the processor, can configure the processor to perform operations. In the operations, a worker node can receive a task for deploying infrastructure resources. The worker node can provide heartbeat notifications to a scheduler node, and a signing proxy can track the heartbeat notifications from the worker node to the scheduler node. While the worker node is attempting to perform the task, the signing proxy can receive from the worker node a request corresponding to performance of the task. The signing proxy can determine, based on the tracked heartbeat notifications, whether a lease of the worker node is valid. If the signing proxy determines that the lease of the worker node is valid, the signing proxy may make a call to a service on behalf of the worker node. If the signing proxy determines that the lease of the worker node is no longer valid, the signing proxy may block access of the worker node to the service.

In further examples, a computer-readable storage medium can store computer-executable instructions that, when executed by at least one processor, can cause the processor to perform operations. In the operations, a worker node can receive a task for deploying infrastructure resources. The worker node can provide heartbeat notifications to a scheduler node a signing proxy can track the heartbeat notifications from the worker node to the scheduler node. While the worker node is attempting to perform the task, the signing proxy can receive a request from the worker node corresponding to performance of the task. The signing proxy can determine based on the tracked heartbeat notifications, whether a lease of the worker node is valid. If the signing proxy determines that the lease of the worker node is valid, the signing proxy may make a call to a service on behalf of the worker node. If the signing proxy determines that the lease of the worker node is no longer valid, the signing proxy may block access of the worker node to the service.

BRIEF DESCRIPTION OF THE DRAWINGS

To easily identify the discussion of any particular element or act, the most significant digit or digits in a reference number refer to the figure number in which that element is first introduced.

FIG. 7 is a diagram for illustrating code used for implementing at least some elements of a cloud infrastructure orchestration service, according to at least one embodiment.

FIG. 8 is a diagram for illustrating code used for implementing at least some elements of a cloud infrastructure orchestration service, according to at least one embodiment.

DETAILED DESCRIPTION

Figure 1:
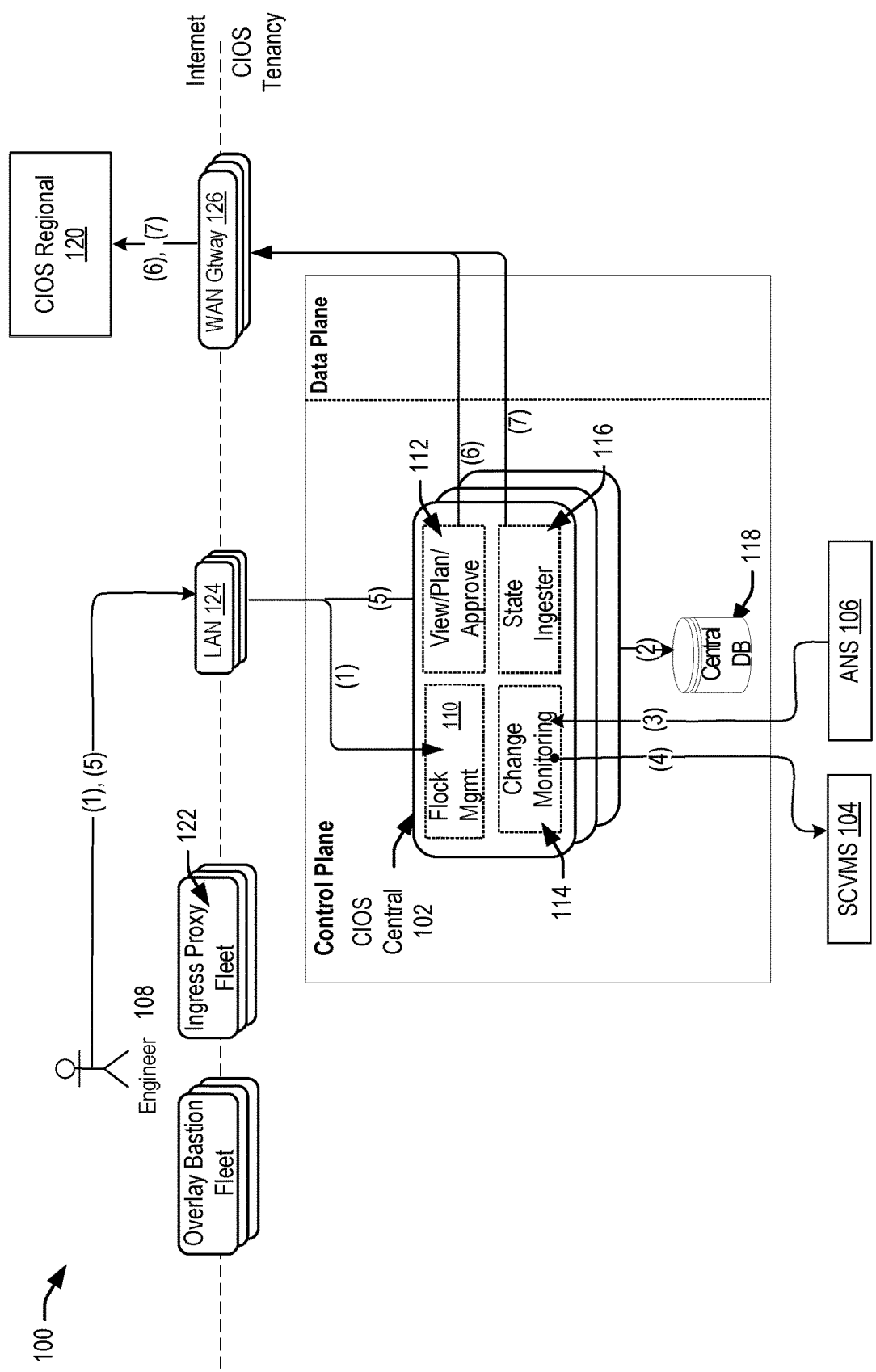
FIG. 1 is a block diagram for illustrating an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured to take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). The following terms will be used throughout:

Infrastructure component—A long-lived piece of infrastructure that supports running code.
  Examples: a deployment application, a load balancer, a domain name system (DNS) entry, an object storage bucket, etc.
Artifact—Code being deployed to a deployment application or a Kubernetes engine cluster, or configuration information (hereinafter, "config") being applied to an infrastructure component. These may be read-only resources.
Deployment task—A short-lived task that is often associated with deploying or testing code. Additionally, the deployments tasks are modeled as resources that live no longer than the release that creates them.

Examples: "deploy $artifact to $environment," "watch $alarm for 10 minutes," "execute $testSuite," or "wait for $manualApproval"

For example, CIOS can model a deployment orchestrator deployment as the creation of a resource that transitions to the Available state when it completes.

Because CIOS maintains the state of its associated declarative provisioner, CIOS can control the lifecycle of these short-lived resources as it relates to releases.

Resource—a CRUD'able resource.

CIOS models each of the constructs listed above as a resource. The next section discusses this modeling in detail.

Flock—CIOS's model encapsulating a control plane and all its components. Exists primarily to model ownership of and point at the infrastructure components.

Flock config—Describes the set of all infrastructure components, artifacts, and deployment tasks associated with a single service.

Each Flock has exactly one Flock config. Flock configs are checked in to source control.

Flock configs are declarative. They expect CIOS to provide realm, region, ad, and artifact versions as input.

Flocks are granular—a Flock consists of a single service and supporting infrastructure.

State—A point-in-time snapshot of the state of every resource in the flock.

Release—A tuple of a specific version of a flock config and a specific version of every artifact that it references. Think of a release as describing a state that may not yet exist.

Release plan—The set of steps that the CIOS would take to transition all regions from their current state to the state described by a release.

Release plans have a finite number of steps and a well-defined start and end time.

Apply—This is a noun. A single attempt to execute a Release plan. An Execution changes the current State of the Flock.

CIOS can be described as an orchestration layer that applies configuration to downstream systems (e.g., worldwide). It is designed to allow world-wide infrastructure provisioning and code deployment with no manual effort from service teams (e.g., beyond an initial approval in some instances). The high level responsibilities of CIOS include, but are not limited to:

Providing teams with a view in to the current state of resources managed by CIOS, including any in-flight change activity.

Helping teams plan and release new changes.

Coordinating activity across various downstream systems within a region to execute approved release plans with no human intervention.

Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS config (which, can itself be an artifact). Additionally, teams can inspect these plans, and may iterate on them by changing the CIOS config and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure config (e.g., provisioning) in one system. CIOS also supports flexible ordering across regions, and across components within a region. Teams can express ordering via checked-in config. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.

Storing an authoritative mapping of Flock metadata to the deployment artifacts and CIOS repositories for the flock.

Coordinating global Releases across Phases and Targets.

Synchronization to enforce policies like "no more than one ongoing release to a Flock at a time."

Detecting changes to Flock configuration (config) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock config, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120.

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
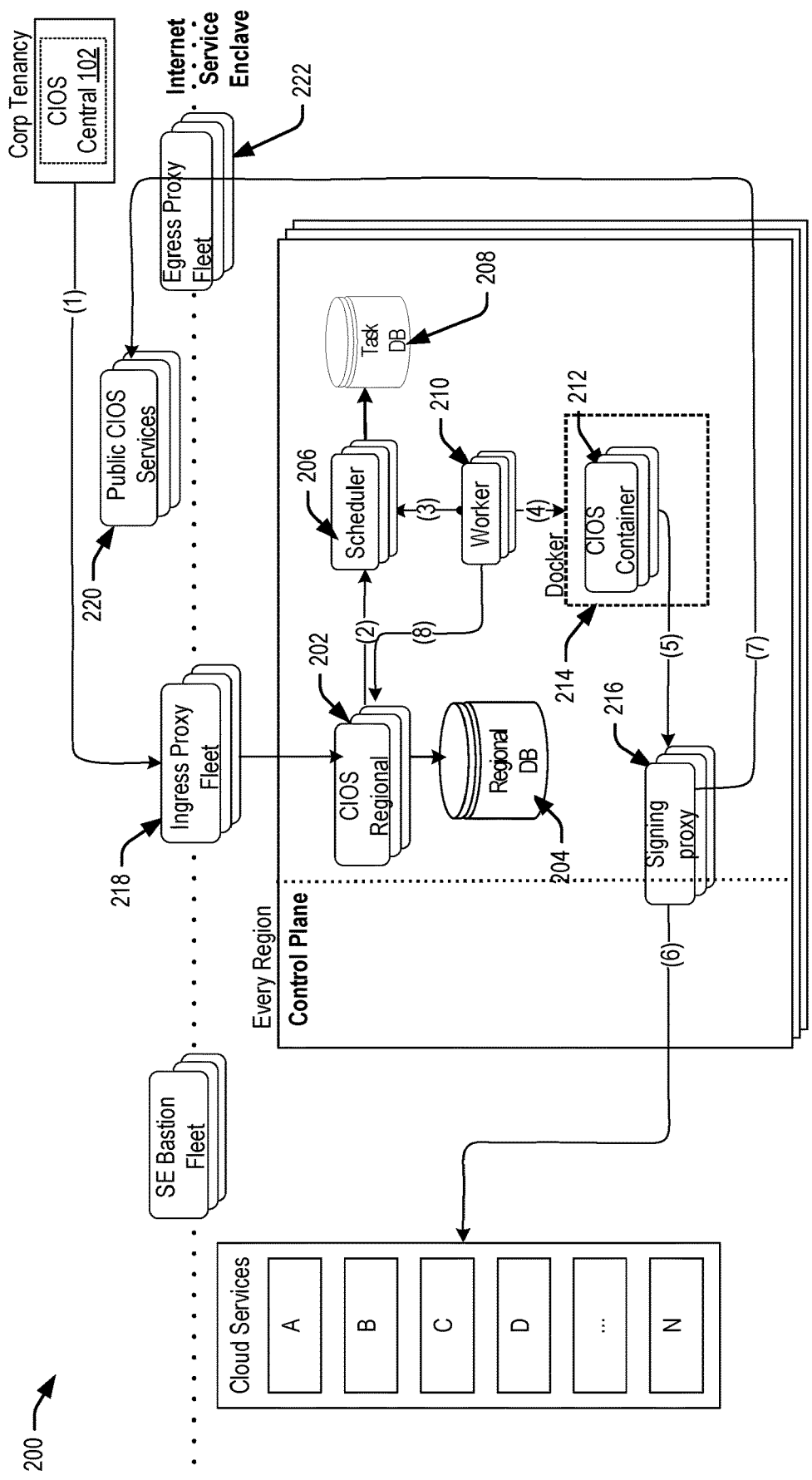
FIG. 2 is a block diagram for illustrating an architecture for implementing at least some elements of a cloud infrastructure orchestration service, according to at least one embodiment.

FIG. 2 depicts an architecture 200 for illustrating techniques for implementing at least CIOS Regional 202. In some examples, CIOS Regional 202 is where much of the work of declarative provisioning and planning, as well as approved release application can occur. In some instances, each instance of CIOS Regional 202 may have a regional fronted that can handle operations at the level of "Execution Targets." It can be configured to perform the following:

Handling all CIOS Authentication for incoming operations from CIOS Central 102.

Enforcing a rule that only one "execution" (plan/import resources/apply plan) can be ongoing for a given Execution target at a time.

Managing binary artifact storage for declarative provisioning artifacts used for input and output during declarative infrastructure provisioning execution. Examples of input are declarative infrastructure provisioning configuration files and an input state file. Typical output is a final state file.

Requesting work from and polls for results from the CIOS Executor for any given execution.

In some instances, the CIOS Frontend may be dependent on a CIOS Executor 206 (also referred to herein as a "scheduler"), which can handle the actual execution. The CIOS Executor, in some examples, operates at the level of "Execution," and it can:

Track a pool of available Worker nodes

Query incoming job requests, and assigns them to eligible workers as available

Track worker status and Execution updates for reporting to clients

Detect dead nodes via a leasing protocol, and can fail tasks assigned to dead nodes, depending on task status.

Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

Poll Executor Worker APIs for assigned work items, and take action to make the assign state match its local state:
  start containers for polls task items that do not exist locally
  kill containers for locally running containers that have no corresponding assigned task item Report status for jobs Stage input and output for job container execution Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g. artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the roll-back plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc.), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from the configuration file and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries—enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
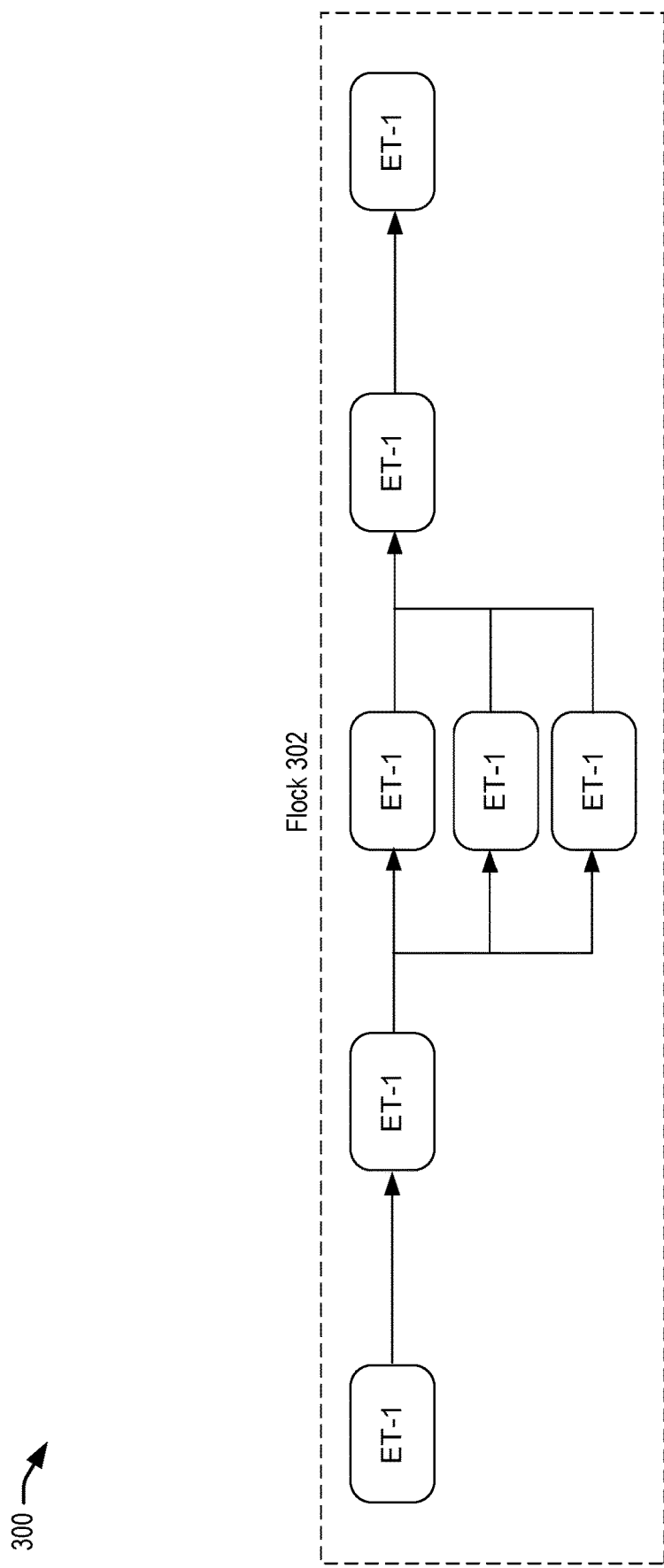
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS refers to each element in the progression, an ExecutionTarget (ET)—this is an internal API specification and does not leak out in to the flock config. CIOS executes ETs based on the DAG 300 defined in the flock config. Each ET (e.g., ET-1, ET-2, ET-3, ET-4, ET-5, ET-6, and ET-7) is, roughly, one copy of the service described by the flock config.

Figure 4:
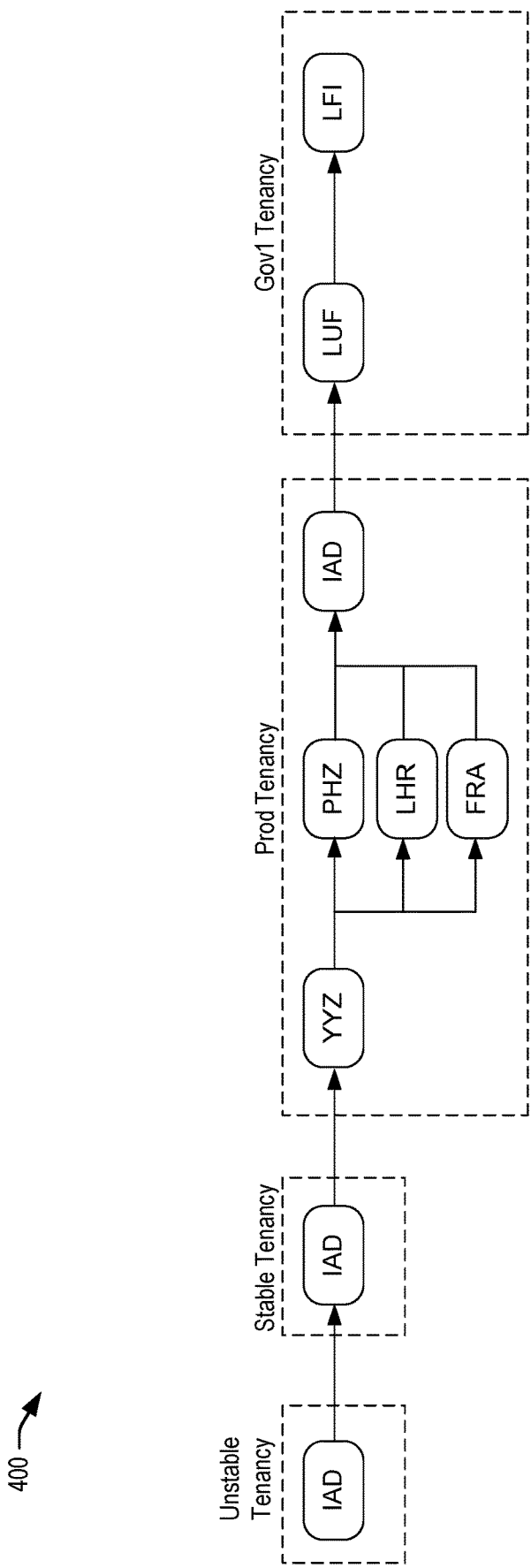
FIG. 4 is a flow diagram for illustrating an example flock, according to at least one embodiment.

FIG. 4 depicts a DAG 400 for illustrating and example flock 402. In the flock config, CIOS is very opinionated about how teams express this progression—they must model it using cloud infrastructure tenancies and regions. Teams should not model progression using realms. CIOS allows teams to use many tenancies within a realm and many regions within a tenancy. However, CIOS does not allow teams to use the same region twice within a tenancy (though they may use the same region twice within a realm—in different tenancies). DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiment, CIOS and/or other techniques described herein are an improvement on each of Terraform (a declarative provisioning tool), Tanden (a code generation tool), and the Oracle Deployment Orchestrator (ODO). Additionally, in some examples, CIOS and/or other techniques described herein can be implemented using at least portions of the Terraform, Tanden, and ODO tools.

Figure 5:
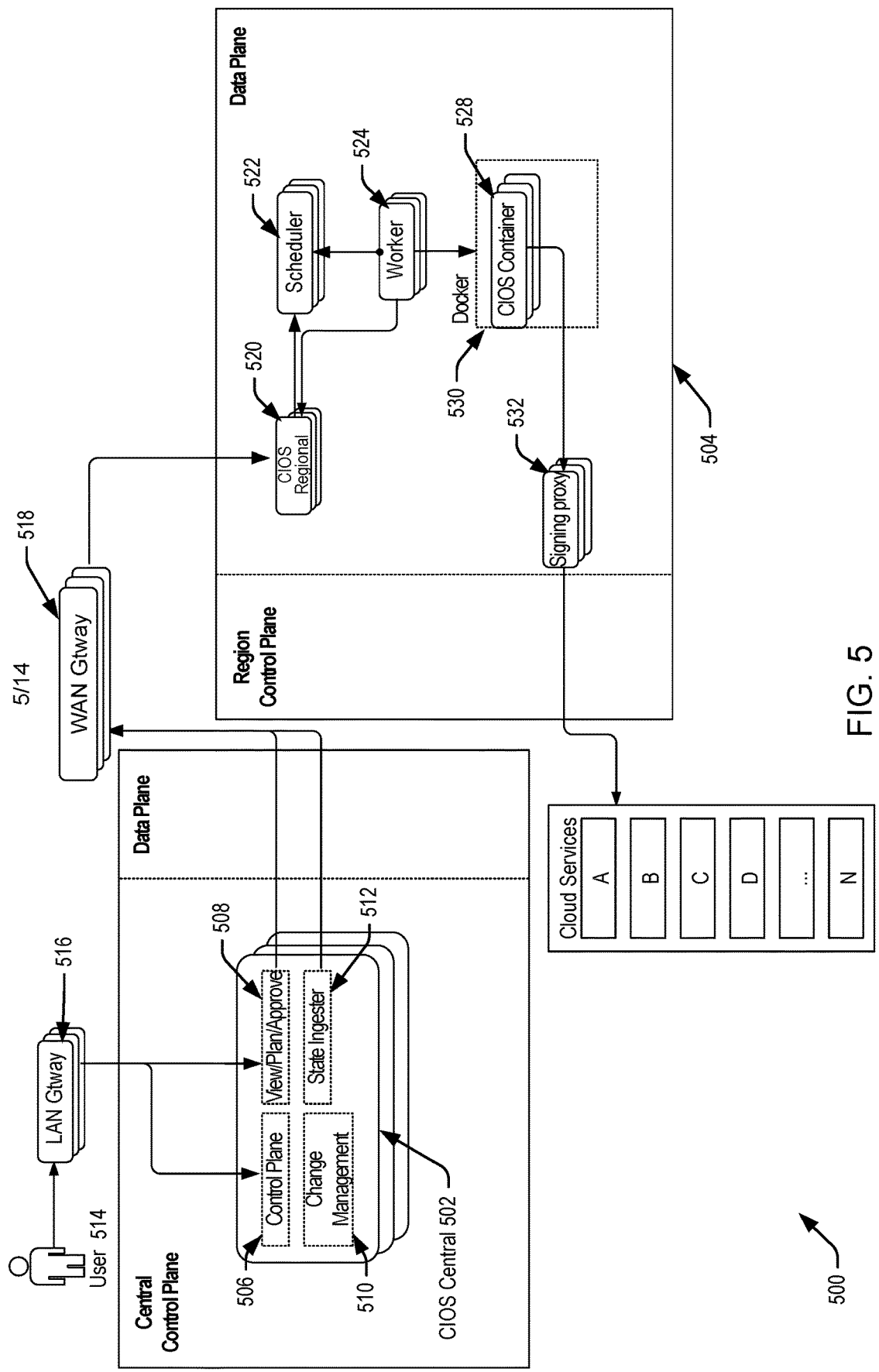
FIG. 5 is a block diagram for illustrating an architecture for implementing at least some elements of a cloud infrastructure orchestration service, according to at least one embodiment.

FIG. 5 depicts a combination block diagram 500 of an architecture for implementing at least some elements of a cloud infrastructure orchestration service, according to at least one embodiment. The block diagram 500 shows both CIOS central 502 (e.g., CIOS central 102 of FIG. 1) and a CIOS region 504. CIOS central 502 can include a control plane 506 (e.g., the control plane 110 of FIG. 1), a view/plan/approve service 508 (e.g., the view/plan/approve service 112 of FIG. 1), a change management service 510 (e.g., the change management service 114 of FIG. 1), and a state ingester service 512 (e.g., the state ingester service 116 of FIG. 1).

A user 514 (e.g., the engineer 108 of FIG. 1) can create a release, which can include at least one deployment, at least one test, both, or any other combination of suitable declarative infrastructure provisioning tool operations, and the user 514 can send the release to CIOS central 502 through a LAN gateway 516 (e.g., the LAN 124 of FIG. 1). CIOS central 502 can post-process the release. The control plane 506, which can be a flock management component, can generate a random release ID and assign this randomly generated release ID to the release. The control plane 506 can augment the release with at least one code file generated in post-processing. Among these code files can be a providers file, which can include at least one declarative infrastructure provisioning tool plugin called a provider, and a locals file. The locals file can include an operation to generate the random release ID, and the random release ID generated in the locals file can be injected into the providers file. A result of post-processing by the control plane 506 can be a release with the original code produced by the user and the augmented code generated by post-processing (the augmented release).

The view/plan/approve service 508 can transmit the augmented release to a CIOS region 504 through a WAN gateway 518 (e.g., the WAN gateway 126 of FIG. 1). The augmented release can be received by CIOS regional 520 (e.g., CIOS regional 202 of FIG. 2), which can be a computing device that generates status reports and keeps track of tasks coming into the CIOS region 504. CIOS regional 520 can transmit tasks from the augmented release to a scheduler 522 (e.g., the scheduler 206 of FIG. 2), which can be a computing device that can assign tasks to a worker 524 (e.g., the worker 210 of FIG. 2), typically to a worker with the least amount of work. In some embodiments, CIOS regional 520 and the scheduler 522 can be on the same computing device. The worker 524 can be a computing device that can execute tasks assigned by the scheduler 522, as well as plugins, and the worker 524 may be part of a worker fleet, which can include many workers 524. The worker 524 can interact with a CIOS container 526 (e.g., CIOS container 212 of FIG. 2), which can exist within a docker 528 (e.g., the docker 214 of FIG. 2). CIOS container 526 can check for a difference in a desired state of an execution target compared to an actual state of the execution target related to the task assigned to the worker 524. If CIOS container 526 identifies the difference, the worker 524 may execute the task, and if CIOS container 526 does not identify the difference, the worker 524 may not execute the task. By executing the task, an API call to cloud services can be made, and the API call may go through a signing proxy 532 (e.g., the signing proxy 216 of FIG. 2). The signing proxy 532 can be a generic HTTP proxy, and the signing proxy 532 can control outgoing network traffic of the CIOS region 504. Specifically, the signing proxy 532 can cut off all outgoing network in certain situations which will be discussed further in FIGS. 10 and 11.

In some embodiments, the release desired to be executed at an execution target may include resources (release resources) that are identical to resources currently at the execution target (execution target resources). In this case, it may still be desirable to execute the release, but existing declarative infrastructure provisioning tool operations may not execute the release resources since the release resources are identical to the execution target resources. However, the techniques described here can be used to execute the release resources at the execution target by forcing a diff (e.g., a comparison function that identifies differences in configuration files). Thus, one technical improvement realized by the techniques described herein is the ability to force a declarative infrastructure provisioning tool to handle releases, essentially re-deploying resources that already exist and/or were already deployed even though declarative infrastructure provisioning tools aren't designed to handle automatic redeployments of resources that are tied to releases.

Forcing a difference can involve instructing a declarative infrastructure provisioning tool that a difference between the current state and the desired state exists. In some embodiments, forcing a difference can be achieved, at least in part, by generating the random release ID. The user 514 may desire to have the resources of the release executed at the execution target regardless of the current state of resources at the execution target, even if the execution target resources are identical to the release resources. In this case, the user 514 may select an option for generating the random release ID in post-processing by the control plane 506. However, in some instances, the control plane 506 may always generate the random release id. The user 514 can then choose whether to use it or not by writing more config (e.g., that overrides the default "use the release id to force differences" behavior). In some embodiments, once generated, the random release ID can be permanently tied to the release. The release can be transmitted to the CIOS region 504, and tasks of the release can be assigned to the worker 524 by the scheduler 522. The worker 524 can communicate with the CIOS container 526, which can run the declarative infrastructure provisioning tool operations. CIOS container 526 can check for a difference in a current state of resources compared to a desired state of resources. Within this check, CIOS container 526 can determine if the release includes a randomly generated release ID, which can be considered forcing the difference. If the randomly generated release ID is unique and is detected by CIOS container 526, CIOS container 526 may determine that a difference does exist between the current state and desired state even if the resources to be deployed are the same as the resources that were already deployed. In response to identifying this difference, the resources of the new release can be deployed.

Figure 6:
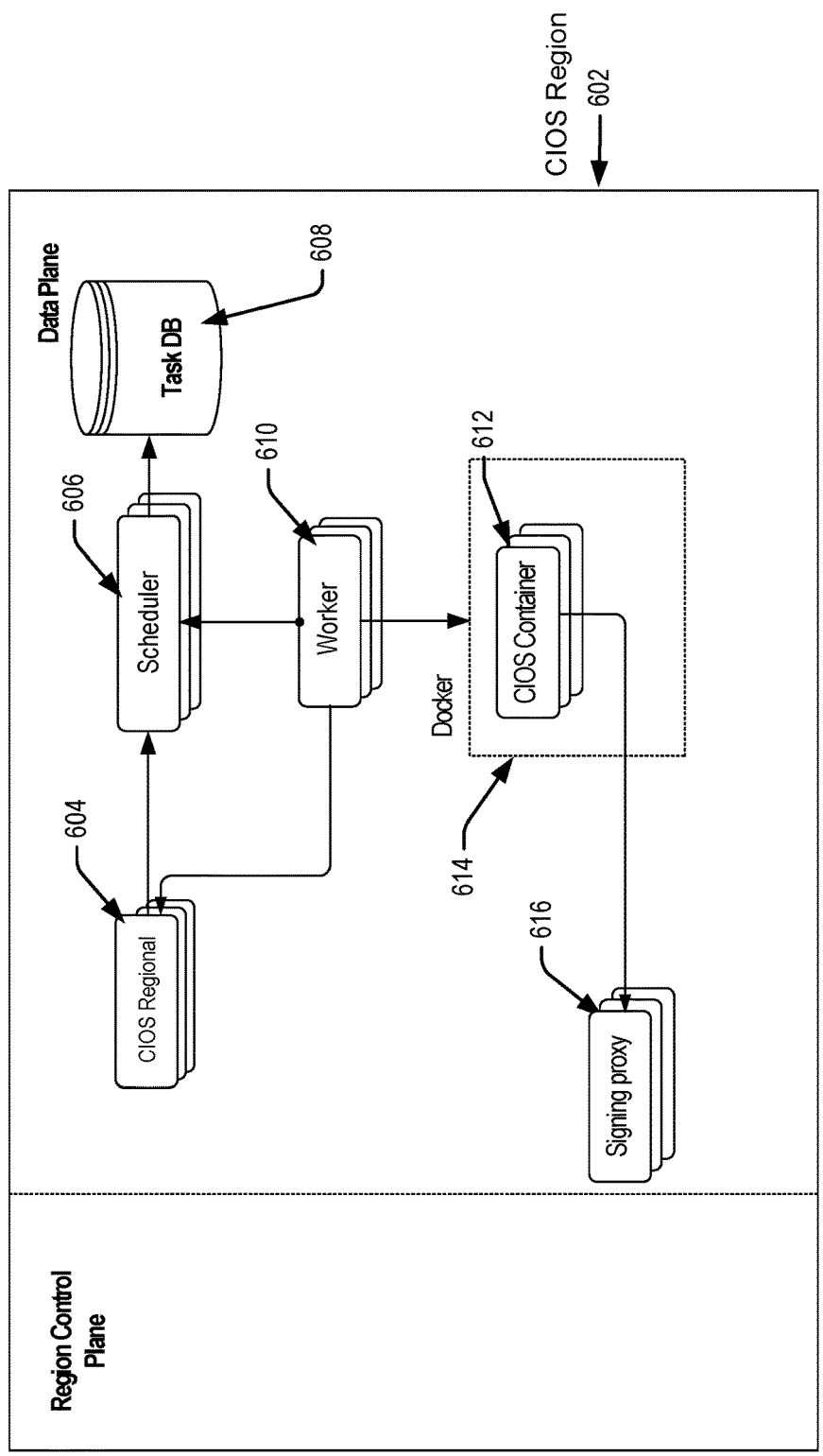
FIG. 6 is a block diagram for illustrating an architecture for implementing at least some elements of a cloud infrastructure orchestration service, according to at least one embodiment.

FIG. 6 depicts a block diagram 600 of a CIOS region 602 (e.g., CIOS region 504 of FIG. 5) architecture for implementing at least some elements of a cloud infrastructure orchestration service, according to at least one embodiment. Similar to portions of FIG. 5, the CIOS region 602 can include CIOS regional 604 (e.g., CIOS regional 520 of FIG. 5) and a scheduler 606 (e.g., the scheduler 522 of FIG. 5), both of which can be a computing device. In some embodiments, CIOS regional 604 and the scheduler 606 can be on the same computing device. The scheduler 606 can be communicatively coupled to a task DB 608 that can help keep track of assigned tasks, and a worker 610 that can be a computing device that executes tasks. The worker 610 can be part of a worker fleet that can include many workers 610. The worker 610 can be communicatively coupled to CIOS container 612 (e.g., CIOS container 528 of FIG. 5), which can be a computing device that can run declarative infrastructure provisioning tool operations within a docker 614 (e.g., the docker 530 of FIG. 5). The worker 610 can communicate with, and transmit releases to, CIOS container 612, and CIOS container 612 can determine whether a difference exists between the current state and desired state. If a difference exists, the worker 610 can execute the assigned task, and, in accordance with executing the assigned task, the worker 610 may execute an outgoing API call, which may go through a signing proxy 616 (e.g., the signing proxy 532 of FIG. 5). The signing proxy 616 may allow the outgoing API call or cut off all outgoing network traffic in certain situations which will be further discussed in FIGS. 10 and 11. While the task DB 608 is shown as a database of the scheduler 606, it may also (or alternatively) be configured as a database for all of CIOS regional 604. This database 608 can be the authority about the change activity happening in-region. Example of what "authority" means: CIOS central (e.g., 502 of FIG. 5) can be out-of-date about what's happening to a particular execution target within CIOS Region 602, which may cause it to ask CIOS regional 604 to make changes when it is not safe to do so. In this example, CIOS regional's database 6008 is what can determine whether it is safe to do so (e.g. there is/isn't change activity already happening for that execution target). In this example, CIOS Regional 604 would check the database 608 and return an HTTP 409 (e.g., Conflict) to CIOS central 502.

In some embodiments, a user (e.g., the user 514 of FIG. 5) may desire to retry a deployment, test, or any other suitable execution of relevant resources. Some non-limiting examples of reasons to retry an execution of resources can be a random failure of a previous execution, a bug in code of the previous execution, and the like. In addition to determining whether a unique release ID is tied to the release, CIOS container 612 can check for an execution ID and a status of the relevant resource. Each time an execution of resources is attempted, the scheduler 610 can generate a unique execution ID, which can be tied to the execution of the resources. In a non-limiting example where the user sends a retry command for the release, the scheduler 610 can generate the execution ID and can assign a task associated with the retry command to the worker 612. The worker 612 can transmit the release ID, execution ID, and resource status to CIOS container 612. If the release ID is different from the current state, CIOS container 612 can identify the difference and the worker 610 can execute the task. If the release ID of the desired state is the same as the release ID of the current state, CIOS container 612 can check the execution ID and the release state. If CIOS container 612 determines that the execution ID of the current execution is different from the execution ID of the previous execution and if CIOS container 612 determines that the release status of the previous execution is "FAILED," or any suitable similar status, then the worker 610 can attempt to execute the task of the resource again. If CIOS container 612 determines that the execution ID is the same as the previous execution or the release status is not failed, then the worker 610 may not execute the task.

FIG. 7 shows a snippet 700 of code for implementing at least some elements of a cloud infrastructure orchestration service, according to at least one embodiment. The snippet 700 depicts code for defining a resource that may execute a deployment at an execution target. The snippet 700 can include a resource type 702, a resource name 704, a release ID 706, and a resource state 708. The resource type 702 can include a deployment, a test, or any other suitable resource type for the relevant resource. The resource name 704 as depicted in the snippet 700 is "executor_ad1," but the resource name 704 can be any name suitable for describing the relevant resource. The release ID 706 as depicted in the snippet 700 is "7e29d6aa-7dc6-4268-9f90-e57caf76e714," but the release ID 706 can be any randomly generated string of characters for identifying a unique release. The resource state 708 as depicted in the snippet 700 is "SUCCEEDED," but the resource state 708 can be any suitable state for describing the relevant resource (e.g., "SUCCEEDED," "FAILED," "APPROVED," "NEEDS APPROVAL," and the like).

In some embodiments, the snippet 700 can function as an address or identifier for a certain resource. A worker node (e.g., the worker 610 of FIG. 6) can receive a task for executing the resource. The worker node can transmit the resource to a CIOS container (e.g., CIOS container 612 of FIG. 6), and the CIOS container can determine whether the resource is unique at least in part using the snippet 700. The CIOS container can compare the resource type 702, the resource name 704, and the release ID 706 from the resource (desired state) to the same of a resource currently at the execution target (current state). If a difference exists between the desired state and the current state, the CIOS container can identify that the difference exists, and the worker node can execute the resource at the execution target.

In some embodiments, the snippet 700 can include another line of code for identifying unique execution attempts, called an execution ID. The execution ID can be a string of characters, which can be randomly generated by a scheduler node (e.g., the scheduler 606 of FIG. 6). The scheduler node can generate a random execution ID for each execution attempt of the resource and transmit the resource having the execution ID to the worker node. The worker node can transmit the resource having the execution ID to the CIOS container, which can determine if a difference exists between the current state and the resource having the execution ID (desired state). If the execution ID of the desired state is different from the current state and the resource state 708 of the current state is "FAILED," the CIOS container can determine that a difference exists between the current state and the desired state. In accordance with the CIOS container identifying the difference, the worker node can execute the resource at the execution target. This operation can be similar to the retry operation previously discussed.

FIG. 8 shows snippets 800 and 802 of code for implementing at least some elements of a cloud infrastructure orchestration service, according to at least one embodiment. The snippets 800 and 802 depict code that can be generated by a flock management component (e.g., the control plane 506 of FIG. 5) during post-processing of a release created by a user (e.g., the user 514 of FIG. 5). The snippet 800 shows an example of a provider file which can include providers, which can be declarative infrastructure provisioning tool plugins. The provider file can include a release ID callout 804, and an execution ID callout 806. The provider file can also include any other suitable providers or plugins for the relevant release. The release ID callout 804 can be an operation that injects a release ID (e.g., the release ID 706 of FIG. 7) into the resource, and as depicted in the snippet 800, the release ID callout 804 is "local.release.id" but can be any suitable callout for injecting the release ID into the resource. The execution ID callout 806 can be an operation that injects an execution ID into the resource, and as depicted in the snippet 800, the execution ID callout 806 is "local.execution.id" but can be any suitable callout for injecting the execution ID into the resource.

The snippet 802 shows an example of a locals file, which can be generated by the flock management component in post-processing of the resource. The locals file can include a release ID 808, and execution target information 810. As depicted in the snippet 802, the release ID 808 is "39ed7b9c-5519-4069-896d-8e17ed4fc29e," but the release ID 808 can be any string of characters suitable for uniquely identifying the release. The execution target information 810 can include various information about the execution target upon which the release is intended to be executed. As depicted in the snippet 802, the execution target information 810 includes an execution target name 812, but the execution target information can be any suitable information related to the execution target. As depicted in the snippet 802, the execution target name 812 is "ap-melbourne-1," but the execution target name 812 can be any suitable name of the execution target at which the resource is intended to be deployed.

The locals file of snippet 802 can include both the release ID 808 and an execution ID. During post-processing of the release, which can occur at CIOS central (e.g., CIOS central 102 of FIG. 1), the flock management component can generate the release ID 808, which can be included in the locals file. The execution ID can be generated by the scheduler node, which can update the locals file with the execution ID. The providers file of snippet 800 can be injected with both the release ID 808 and the execution ID by utilizing the release ID callout 804 and the execution ID callout 806.

Figure 9:
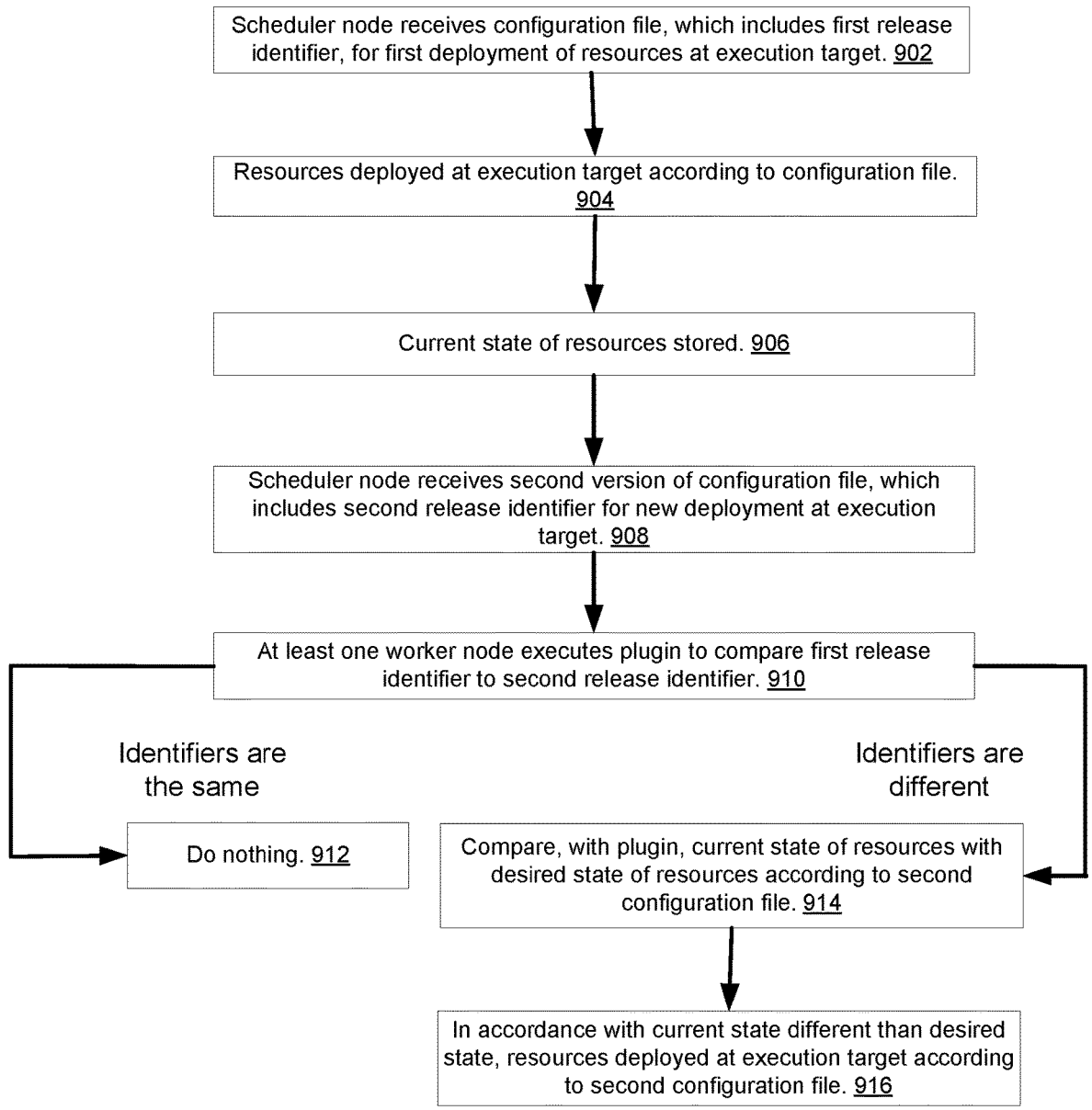
FIG. 9 is a flow diagram for illustrating an example process for implementing at least some elements of a cloud infrastructure orchestration service, according to at least one embodiment.

FIG. 9 illustrates an example flow diagram showing process 900 for implementing techniques of CIOS, according to certain embodiments of the present disclosure. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process 900 may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 900 may be performed by a plurality of processors in parallel. The computer-readable storage medium may be non-transitory.

FIG. 9 depicts an example flow diagram showing a process 900 for implementing a technique of CIOS to deploy resources at execution targets, according to at least one embodiment. The process 900 may start at block 902, where a scheduler node (e.g., the scheduler 206 of FIG. 2) receives a configuration file, which can include a first release ID (e.g., the release ID 808 of FIG. 8), for a first deployment of resources at an execution target. The scheduler node can transmit the configuration file to a worker node (e.g., the worker 210 of FIG. 2), which can be part of a worker fleet that includes many worker nodes.

In block 904, the first deployment of resources according to the configuration file is executed at the execution target, in some embodiments carried out by the worker node. In some examples, the execution target can be empty or otherwise without any resources deployed to it. The worker node can transmit the configuration file to a CIOS container (e.g., CIOS container 212 of FIG. 2) for determining whether a difference exists between resources currently at the execution target (current state) and resources in the configuration file (desired state). Since, in block 904, the execution target may be without any resources, the difference can exist and the worker node can execute the first deployment of resources at the execution target.

In block 906, a current state of the resources at the execution target is stored. In some examples, once the first deployment of resources at the execution target is carried out by the worker node, a current state of the resources at the execution target can be stored. The current state can be utilized in subsequent comparisons at least in part for determining whether or not to deploy subsequent releases at the execution target.

In block 908, the scheduler node receives a second configuration file, which can include a second release ID, for a second deployment of resources at the execution target. The scheduler node can transmit the second configuration file to the worker node with a task to execute the second deployment of resources at the execution target.

In block 910, the worker node executes a plugin to compare the first release ID to the second release ID. The worker node can transmit the second configuration file to the CIOS container. In some examples, the CIOS container can determine whether a difference exists between the current state, as stored in block 906 of process 900, and the desired state, as defined in the second configuration file by comparing the first release ID to the second release ID.

In block 912, in accordance with the CIOS container determining a difference does not exist between the first release ID and the second release ID, the worker node takes no action, and the second deployment may not occur. In block 914, in accordance with the CIOS container determining that a difference exists between the first release ID and the second release ID, the CIOS container can compare the current state of resources at the execution target to the desired state of resources defined in the second configuration file. In some examples, in accordance with the CIOS container determining that a difference exists between the first release ID and the second release ID at block 910, the CIOS container can skip straight to block 916.

In block 916, in accordance with the CIOS container determining the current state of resources is different than the desired state of resources as defined by the second configuration file, resources can be deployed at the execution target according to the second configuration file. The worker node can complete the task assigned to it by the scheduler node by executing the second deployment of resources at the execution target. In some examples, the CIOS container may determine that the first release ID and the second release ID are the same, which may indicate the user desires to retry the deployment. In this case, the CIOS container may compare a first execution ID of the first configuration file and a second execution ID of the second configuration file. In accordance with the CIOS container determining that the first execution ID and the second execution ID are different, the CIOS container can check a release status of the first configuration file. If the release status of the first configuration file is "FAILED," or any other similar status indicating the first deployment of resources may not have been successful, the worker node can execute the second deployment of resources as defined by the second configuration file.

Figure 10:
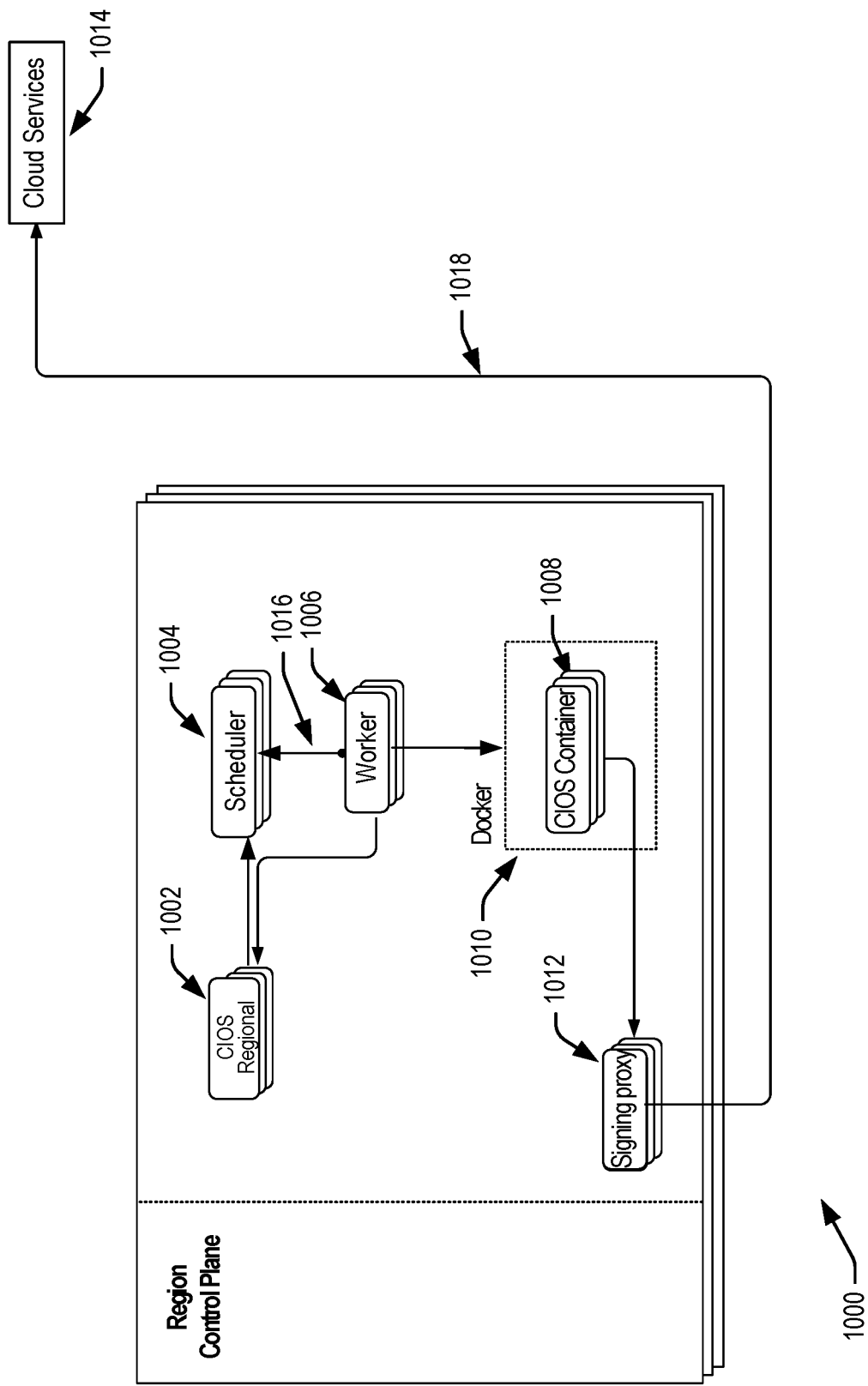
FIG. 10 is a block diagram for illustrating an architecture for implementing at least some elements of a cloud infrastructure orchestration service, according to at least one embodiment.

FIG. 10 depicts a simplified architecture 1000 for illustrating techniques for preventing concurrent execution of declarative infrastructure provisioning tools, according to at least one embodiment. The simplified architecture 1000 can include CIOS Regional 1002 (e.g., similar to CIOS Regional 202 of FIG. 2) a scheduler 1004 (e.g., similar to scheduler 206 of FIG. 2), a worker 1006 (e.g., similar to worker 210 of FIG. 2), a CIOS container 1008 (e.g., similar to CIOS container 212 of FIG. 2), a docker 1010 (e.g., similar to the docker 214 of FIG. 2), and a signing proxy 1012 (e.g., similar to the signing proxy 216 of FIG. 2). The scheduler 1004 can be responsible for managing the capacity of a worker 1006 of a worker fleet, assigning tasks to workers 1006, and keeping track of task state. The worker fleet can be a fleet of JVMs that manage declarative provisioning images. The worker fleet receives instructions from the scheduler 1004 and communicates results to both the scheduler 1004 and CIOS Regional 1002. The CIOS container 1008 can run declarative provisioning actions in its own private docker 1010 container.

The signing proxy 1012 can control network connectivity of CIOS Regional 1002, which can dictate whether or not any API calls are made to cloud services 1014. The signing proxy 1012 may test a lease 1016 between the scheduler 1004 and each worker 1006 from the worker fleet. In an example embodiment, the lease 1016 is a heartbeat notification, where each worker 1006 can constantly send notifications to the scheduler 1004 that it is running and that it is working on an assigned task. A frequency of the heartbeat notification can be the same among all workers 1006 in the worker fleet, can be selected by the scheduler 1004, or can be configured by a user/developer of the system. In some examples, the frequency can be two seconds, three seconds, four seconds, five seconds, or any other suitable amount of time for monitoring progress of the worker 1006. If the lease 1016 is valid, meaning the scheduler 1004 receives the heartbeat notification from the worker 1006, then the signing proxy 1012 may execute a call 1018 to cloud services 1014. If the lease 1016 is invalid, meaning the scheduler 1004 does not receive the heartbeat notification, then the signing proxy 1012 may not execute the call 1018 to cloud services, and instead, the signing proxy 1012 may cut off all outgoing network traffic, yielding no API calls, to prevent concurrent execution of tasks assigned to the worker fleet. In an example case where the signing proxy 1012 cuts off all outgoing network traffic, the worker 1006, the CIOS Container 1008, or any other suitable component can continue to run a declarative provisioner, but it may be that no progress is made due to a lack of API calls to cloud services 1014.

In an example embodiment, each worker 1006 in the worker fleet is given a maximum of one unique task by the scheduler 1004, and each worker sends heartbeat notifications to the scheduler 1004, letting the scheduler 1004 know that the lease 1016 is valid. Workers 1006 that successfully send the heartbeat notification can be considered healthy workers, and workers 1006 that do not successfully send the heartbeat notification can be considered unhealthy workers. Reasons for a worker 1006 not sending the heartbeat notification include a host of the worker failing, a process of the worker failing, a relationship between the worker 1006 and the scheduler 1004 failing (e.g., load balancer, network connectivity, etc.), or any other suitable reason for not sending a heartbeat notification. In the case of an unhealthy worker in the worker fleet, there can be a risk of concurrent execution of a task. If the task is executed concurrently, there can be a risk of destruction to the infrastructure. This risk can be mitigated or eliminated when the signing proxy 1012 cuts off all outgoing network traffic, preventing any API calls, when it doesn't receive a heartbeat notification and identifies an unhealthy worker.

Figure 11:
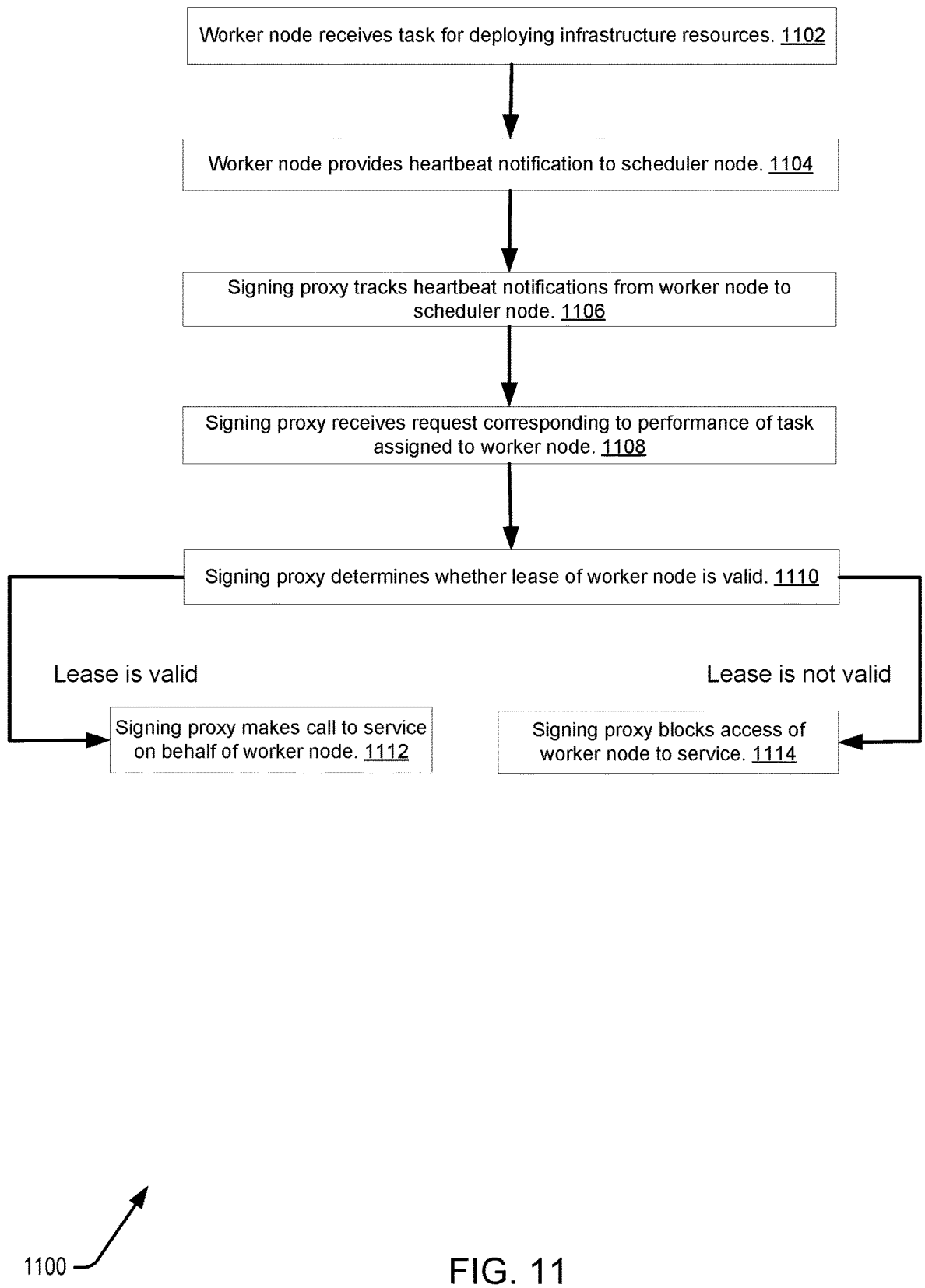
FIG. 11 is a flow diagram for illustrating an example process for implementing at least some elements of a cloud infrastructure orchestration service, according to at least one embodiment.

FIG. 11 illustrates an example flow diagram showing process 1100 for implementing techniques of CIOS, according to certain embodiments of the present disclosure. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process 1100 may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 1100 may be performed by a plurality of processors in parallel. The computer-readable storage medium may be non-transitory.

FIG. 11 depicts an example flow diagram showing a process 1100 for implementing a technique of CIOS to prevent concurrent execution of declarative infrastructure provisioners, according to at least one embodiment. The process 1100 may begin at block 1102, where a worker node (e.g., worker 1006 of FIG. 10) receives a task for deploying infrastructure resources. The task can be given to the worker node by a scheduler node (e.g., scheduler 1004 of FIG. 10), and the worker node may only be given one unique task at any given time. However, in some examples, worker nodes can handle many tasks at a time.

In block 1104, the worker node provides a heartbeat notification to the scheduler node. The heartbeat notification can be a notification that the worker node is running and that the worker node is executing the task given to the worker node by the scheduler node. The conveyance of the heartbeat notification from the worker node to the scheduler node can be called the lease (e.g., the lease 1016 of FIG. 10).

In block 1106, a signing proxy (e.g., the signing proxy 1012 of FIG. 10) tracks the heartbeat notifications that the worker node sends to the scheduler node. Each worker node in the worker fleet can send heartbeat notifications to the scheduler node, and the signing proxy can track each of these heartbeat notifications in an attempt to identify any worker nodes that may be unhealthy.

In block 1108, the signing proxy receives a request from the worker node corresponding to performance of the task assigned to the worker node. The request can involve making an API call to cloud services (e.g., cloud services 1002 of FIG. 10).

In block 1110, the signing proxy determines whether or not the lease e.g., of the worker node that made the request in block 1108 is valid. The signing proxy can determine whether or not the heartbeat notification from the worker node was transmitted properly to the scheduler node. If the heartbeat notification was not properly transmitted from the worker node to the scheduler node, the signing proxy may consider the worker node to be unhealthy.

In block 1112, in accordance with the signing proxy determining that the lease is valid, the signing proxy makes a call to cloud services on behalf of the worker node. If the worker node successfully transmits the heartbeat notification to the scheduler node, the signing proxy may determine that the worker node is healthy. The signing proxy may execute API calls to cloud services on behalf of healthy worker nodes.

In block 1114, in accordance with the signing proxy determining that the lease is invalid, the signing proxy does not make the call to cloud services, and instead blocks access of the worker node to cloud services. If the worker node does not successfully transmit the heartbeat notification to the scheduler node, the signing proxy may determine that the worker node is unhealthy. An unhealthy worker node can execute tasks that are already being executed by a different healthy worker node. Concurrent execution of tasks in this manner may risk destruction to infrastructure. To mitigate or eliminate this risk, the signing proxy can cut off all outgoing network traffic and prevent the worker node from accessing cloud services, which can prevent concurrent execution of tasks assigned to worker nodes.

Figure 12:
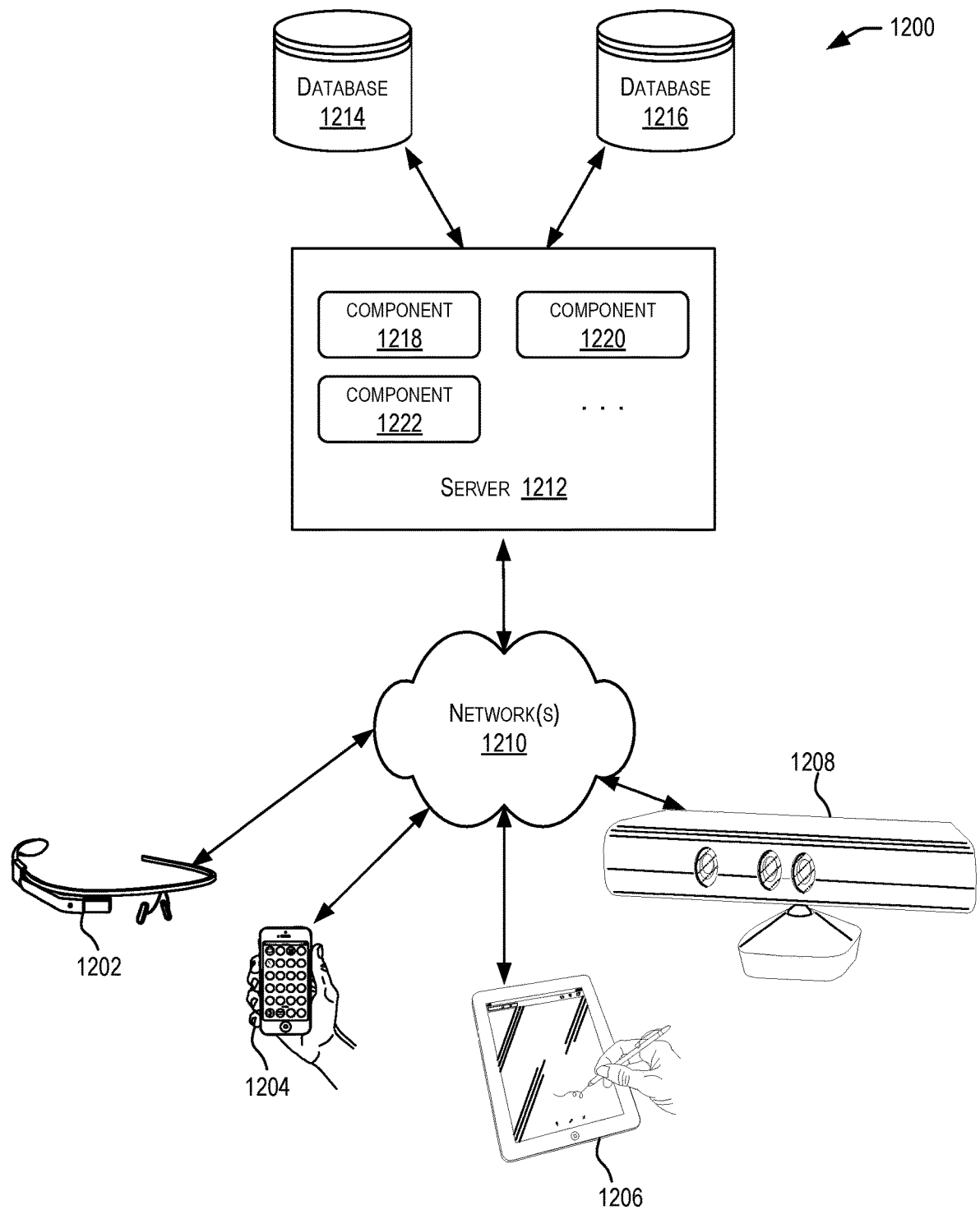
FIG. 12 is a block diagram for illustrating a distributed system, according to at least one embodiment.
Figure 13:
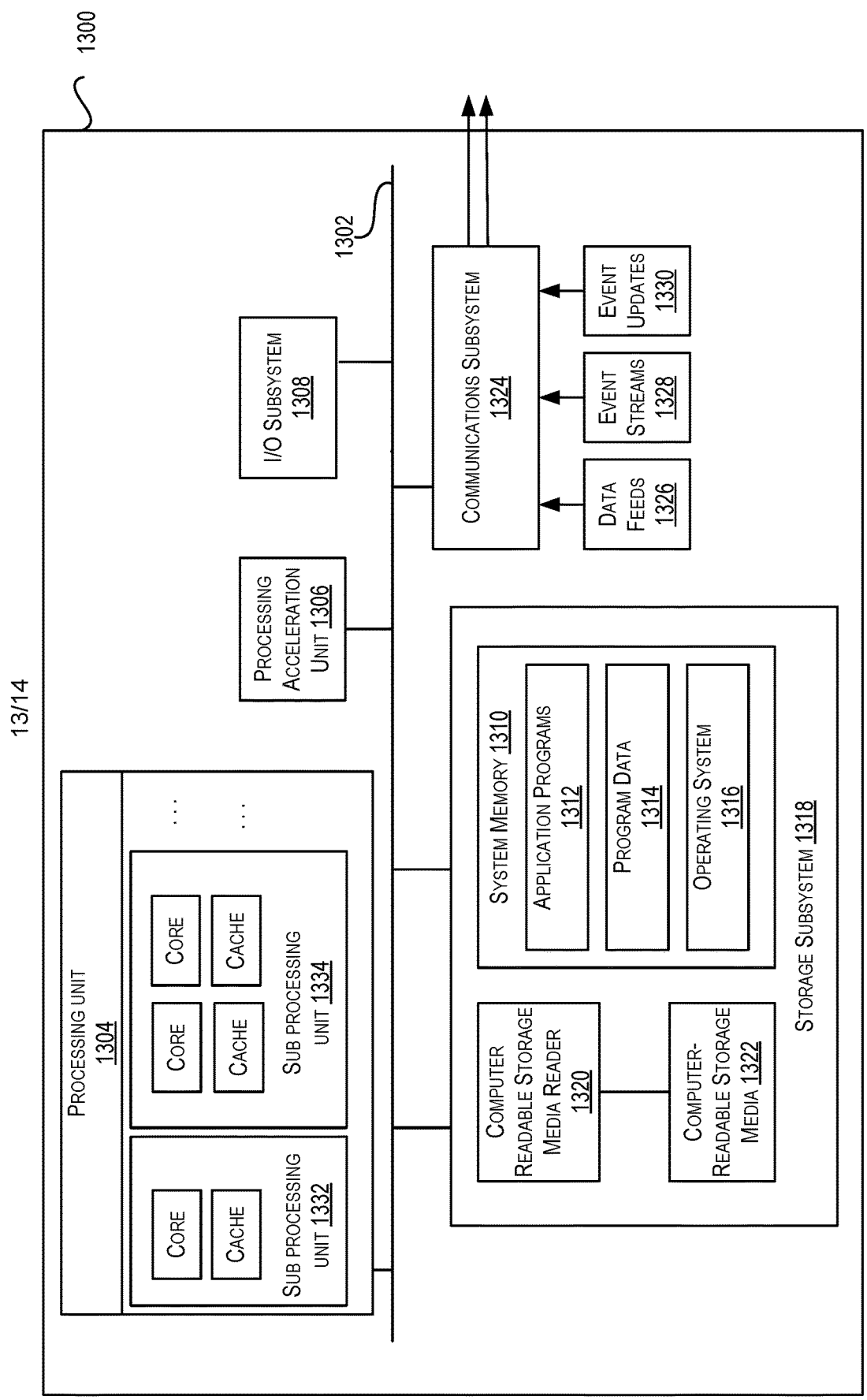
FIG. 13 is a block diagram for illustrating one or more components of a system environment by which services provided by one or more components of an embodiment system may be offered as cloud services, according to at least one embodiment.

FIGS. 12-13 illustrate aspects of example environments for implementing aspects of the present disclosure in accordance with various embodiments. FIG. 12 depicts a simplified diagram of a distributed system 1200 for implementing an embodiment of the present disclosure. In the illustrated embodiment, the distributed system 1200 includes one or more client computing devices 1202, 1204, 1206, and 1208, which are configured to execute and operate a client application such as a web browser, proprietary client (e.g., Oracle Forms), or the like over one or more network(s) 1210. The server 1212 may be communicatively coupled with the remote client computing devices 1202, 1204, 1206, and 1208 via network 1210.

In various embodiments, the server 1212 may be adapted to run one or more services or software applications such as services and applications that provide identity management services. In certain embodiments, the server 1212 may also provide other services or software applications can include non-virtual and virtual environments. In some embodiments, these services may be offered as web-based or cloud services or under a Software as a Service (SaaS) model to the users of the client computing devices 1202, 1204, 1206, and/or 1208. Users operating the client computing devices 1202, 1204, 1206, and/or 1208 may in turn utilize one or more client applications to interact with the server 1212 to utilize the services provided by these components.

In the configuration depicted in FIG. 12, the software components 1218, 1220 and 1222 of system 1200 are shown as being implemented on the server 1212. In other embodiments, one or more of the components of the system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

The client computing devices 1202, 1204, 1206, and/or 1208 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1210.

Although distributed system 1200 in FIG. 12 is shown with four client computing devices, any number of client computing devices may be supported. Other devices, such as devices with sensors, etc., may interact with the server 1212.

The network(s) 1210 in the distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1212 can include one or more virtual machines running virtual operating systems, or other computing architectures involving virtualization. One or more flexible pools of logical storage devices can be virtualized to maintain virtual storage devices for the server. Virtual networks can be controlled by the server 1212 using software defined networking. In various embodiments, the server 1212 may be adapted to run one or more services or software applications described in the foregoing disclosure. For example, the server 1212 may correspond to a server for performing processing as described above according to an embodiment of the present disclosure.

The server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1212 may include one or more applications to analyze and consolidate data feeds and/or event updates received from users of the client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1212 may also include one or more applications to display the data feeds and/or real-time events via one or more display devices of the client computing devices 1202, 1204, 1206, and 1208.

The distributed system 1200 may also include one or more databases 1214 and 1216. These databases may provide a mechanism for storing information such as user identity information, and other information used by embodiments of the present disclosure. Databases 1214 and 1216 may reside in a variety of locations. By way of example, one or more of databases 1214 and 1216 may reside on a non-transitory storage medium local to (and/or resident in) the server 1212. Alternatively, the databases 1214 and 1216 may be remote from the server 1212 and in communication with the server 1212 via a network-based or dedicated connection. In one set of embodiments, the databases 1214 and 1216 may reside in a storage-area network (SAN). Similarly, any necessary files for performing the functions attributed to the server 1212 may be stored locally on the server 1212 and/or remotely, as appropriate. In one set of embodiments, the databases 1214 and 1216 may include relational databases, such as databases provided by Oracle, that are adapted to store, update, and retrieve data in response to SQL-formatted commands.

FIG. 13 illustrates an example computer system 1300 that may be used to implement an embodiment of the present disclosure. In some embodiments, computer system 1300 may be used to implement any of the various servers and computer systems described above. As shown in FIG. 13, computer system 1300 includes various subsystems including a processing subsystem 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 may include tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1304 controls the operation of computer system 1300 and may comprise one or more processing units 1332, 1334, etc. A processing unit may include be one or more processors, including single core or multicore processors, one or more cores of processors, or combinations thereof. In some embodiments, processing subsystem 1304 can include one or more special purpose co-processors such as graphics processors, digital signal processors (DSPs), or the like. In some embodiments, some or all of the processing units of processing subsystem 1304 can be implemented using customized circuits, such as application specific integrated circuits (ASICs), or field programmable gate arrays (FPGAs).

In some embodiments, the processing units in processing subsystem 1304 can execute instructions stored in system memory 1310 or on computer readable storage media 1322. In various embodiments, the processing units can execute a variety of programs or code instructions and can maintain multiple concurrently executing programs or processes. At any given time, some or all of the program code to be executed can be resident in system memory 1310 and/or on computer-readable storage media 1310 including potentially on one or more storage devices. Through suitable programming, processing subsystem 1304 can provide various functionalities described above for dynamically modifying documents (e.g., webpages) responsive to usage patterns.

In certain embodiments, a processing acceleration unit 1306 may be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term "input device" is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information that is used by computer system 1300. Storage subsystem 1318 provides a tangible non-transitory computer-readable storage medium for storing the basic programming and data constructs that provide the functionality of some embodiments. Software (programs, code modules, instructions) that when executed by processing subsystem 1304 provide the functionality described above may be stored in storage subsystem 1318. The software may be executed by one or more processing units of processing subsystem 1304. Storage subsystem 1318 may also provide a repository for storing data used in accordance with the present disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may be stored in the ROM. The RAM may contain data and/or program modules that are presently being operated and executed by processing subsystem 1304. In some implementations, system memory 1310 may include multiple different types of memory, such as static random access memory (SRAM) or dynamic random access memory (DRAM).

By way of example, and not limitation, as depicted in FIG. 13, system memory 1310 may store application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1322 may store programming and data constructs that provide the functionality of some embodiments. Software (programs, code modules, instructions) that when executed by processing subsystem 1304 a processor provide the functionality described above may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1322 may provide storage of computer-readable instructions, data structures, program modules, and other data for computer system 1300.

In certain embodiments, storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for storing computer-readable information.

In certain embodiments, computer system 1300 may provide support for executing one or more virtual machines. Computer system 1300 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1300. Accordingly, multiple operating systems may potentially be run concurrently by computer system 1300. Each virtual machine generally runs independently of the other virtual machines.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices. Additionally, communication subsystem 1324 may be used to communicate notifications of successful logins or notifications to re-enter a password from the privileged account manager to the requesting users.

Communication subsystem 1324 may support both wired and/or wireless communication protocols. For example, in certain embodiments, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

Communication subsystem 1324 can receive and transmit data in various forms. For example, in some embodiments, communications subsystem 1324 may receive input communication in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), click-stream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

Figure 14:
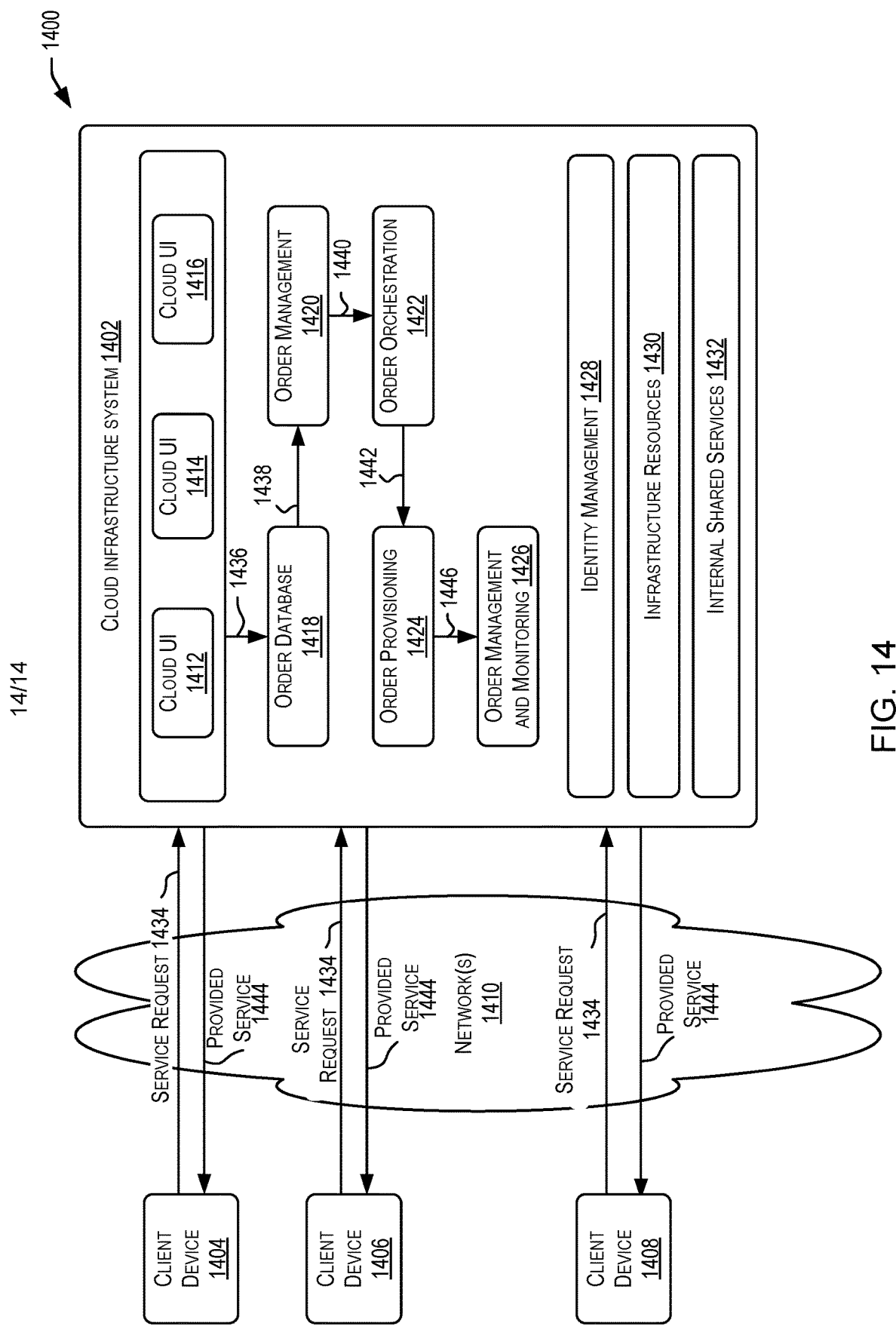
FIG. 14 is a block diagram for illustrating an example computer system, in which various embodiments of the present disclosure may be implemented.

FIG. 14 is a simplified block diagram of one or more components of a system environment 1400 by which services provided by one or more components of an embodiment system may be offered as cloud services, in accordance with an embodiment of the present disclosure. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the embodiment shown in the figure is only one example of a cloud infrastructure system that may incorporate an embodiment of the disclosure. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1202, 1204, 1206, and 1208.

Although example system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network familiar to those skilled in the art that can support data communications using any of a variety of commercially-available protocols, including those described above for network(s) 1210.

Cloud infrastructure system 1402 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In example operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406 and/or 1408 by order provisioning module 1424 of cloud infrastructure system 1402. At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method, comprising:
    tracking, by a signing proxy of a worker node, heartbeat notifications from the worker node to a scheduler node;

receiving, by the signing proxy, a request corresponding to performance of a task;

determining, by the signing proxy and based at least in part on the tracked heartbeat notifications, whether a last heartbeat notification of the tracked heartbeat notifications was received by the scheduler node within a time period;

in accordance with a determination that the last heartbeat notification of the heartbeat notifications was received by the scheduler node, making, by the signing proxy, a call associated with the task to a service on behalf of the worker node; and in accordance with a determination that the last heartbeat notification of the tracked heartbeat notifications was not received by the scheduler node, blocking, by the signing proxy, access of the worker node to the service.

2. The method of claim 1, wherein the worker node is configured to implement code of a declarative infrastructure provisioning tool.

3. The method of claim 1, wherein the task comprises an infrastructure deployment task within a region based at least in part on the code of the declarative infrastructure provisioning tool.

4. The method of claim 3, wherein the service comprises a web service external to the region.

5. The method of claim 1, wherein the request comprises an application programming interface (API) call.

6. The method of claim 1, wherein the heartbeat notifications comprise first information identifying that the worker node is operational and second information identifying the task that the worker node is attempting to perform.

7. The method of claim 1, wherein the task is received from the scheduler node.

8. The method of claim 1, further in accordance with the determination that the last heartbeat notification was not received by the scheduler node, assigning, by the scheduler node, the task to a second worker node.

9. The method of claim 1, wherein the time period is determined by the scheduler node.

10. The method of claim 1, wherein the signing proxy runs on a same host as the worker node.

11. The method of claim 1, wherein the scheduler node is configured to assign a single task to one worker node at a time.

12. A system, comprising:
one or more processors; and
one or more memories storing computer-executable instructions that, when executed by the one or more processors, configure the one or more processors to:
track, by a signing proxy of a worker node, heartbeat notifications from the worker node to a scheduler node;
receive, by the signing proxy, a request corresponding to performance of a task;
determine, by the signing proxy and based at least in part on the tracked heartbeat notifications, whether a last heartbeat notification of the heartbeat notifications was received by the scheduler node within a time period;
in accordance with a determination that the last heartbeat notification of the heartbeat notifications was received by the signing proxy, a call associated with the task to a service on behalf of the worker node; and
in accordance with a determination that the last heartbeat notification of the tracked heartbeat notifications was not received by the scheduler node, blocking, by the signing proxy, access of the worker node to the service.

13. The system of claim 12, wherein the worker node is configured to implement code of a declarative infrastructure provisioning tool, wherein the task comprises an infrastructure deployment task within a region based at least in part on the code of the declarative infrastructure provisioning tool, and wherein the service comprises a web service external to the region.

14. The system of claim 12, wherein the heartbeat notifications comprise at least one of first information identifying that the worker node is operational or second information identifying the task that the worker node is attempting to perform.

15. A non-transitory computer-readable storage medium storing computer-executable instructions that, when executed by one or more processors, cause the one or more processors to perform operations comprising:
tracking, by a signing proxy of a worker node, heartbeat notifications from the worker node to a scheduler node;
receiving, by the signing proxy, a request corresponding to performance of a task;
determining, by the signing proxy and based at least in part on the tracked heartbeat notifications, whether a last heartbeat notification of the heartbeat notifications was received by the scheduler node within a time period;
in accordance with a determination that the last heartbeat notification of the tracked heartbeat notifications was received by the scheduler node, making, by the signing proxy, a call associated with the task to a service on behalf of the worker node; and
in accordance with a determination that the last heartbeat notification of the tracked heartbeat notifications was not received by the scheduler node, blocking, by the signing proxy, access of the worker node to the service.

16. The non-transitory computer-readable storage medium of claim 15, wherein the heartbeat notifications comprise first information identifying that the worker node is operational and second information identifying the task that the worker node is attempting to perform.

17. The non-transitory computer-readable storage medium of claim 15, wherein the task is received from the scheduler node.

18. The non-transitory computer-readable storage medium of claim 15, further in accordance with the determination that the last heartbeat notification was not received by the scheduler node, assigning, by the scheduler node, the task to a second worker node.

19. The non-transitory computer-readable storage medium of claim 15, wherein the time period is determined by the scheduler node.

20. The non-transitory computer-readable storage medium of claim 15, wherein the task comprises an infrastructure deployment task within a region based at least in part on the code of the declarative infrastructure provisioning tool.

* * * * *